(12) United States Patent
Garcia Barace et al.

(10) Patent No.: US 8,380,357 B2
(45) Date of Patent: Feb. 19, 2013

(54) WIND TURBINE CONTROL

(75) Inventors: Alberto Garcia Barace, Sarriguren (ES); Igor Egaña Santamarina, Sarriguren (ES); Antonio Torres Elizondo, Sarriguren (ES); Stephen Tonks, Sarriguren (ES); Eduardo Azanza Ladrón, Sarriguren (ES); José Miguel García Sayes, Sarriguren (ES); Miguel Nuñez Polo, Sarriguren (ES)

(73) Assignee: Acciona Windpower, S.A., Sarriguren, Navarra (ES)

( * ) Notice: Subject to any disclaimer, the term of this patent is extended or adjusted under 35 U.S.C. 154(b) by 281 days.

(21) Appl. No.: 12/728,546

(22) Filed: Mar. 22, 2010

(65) Prior Publication Data

US 2010/0241280 A1    Sep. 23, 2010

(30) Foreign Application Priority Data

Mar. 23, 2009  (ES) .................................. 200900783

(51) Int. Cl.
*G05D 17/02*    (2006.01)
*H02P 9/04*    (2006.01)
(52) U.S. Cl. .............................. 700/287; 290/44; 290/55
(58) Field of Classification Search .................. 700/287; 290/44, 55
See application file for complete search history.

(56) References Cited

U.S. PATENT DOCUMENTS

| | | | |
|---|---|---|---|
| 4,339,666 A * | 7/1982 | Patrick et al. ................. | 290/44 |
| 6,688,841 B1 | 2/2004 | Wobben | |
| 6,850,821 B2 * | 2/2005 | Weitkamp .................... | 700/286 |
| 6,909,198 B2 * | 6/2005 | Ragwitz et al. ............... | 290/44 |
| 7,042,110 B2 * | 5/2006 | Mikhail et al. ................ | 290/44 |
| 7,231,282 B2 * | 6/2007 | Schubert et al. .............. | 700/287 |
| 7,352,076 B1 * | 4/2008 | Gabrys ......................... | 290/44 |
| 7,476,985 B2 * | 1/2009 | Llorente Gonzalez ........ | 290/44 |
| 7,552,614 B2 * | 6/2009 | Wobben ........................ | 73/1.29 |
| 7,573,149 B2 * | 8/2009 | Kammer et al. .............. | 290/55 |
| 7,622,816 B2 * | 11/2009 | Stahlkopf ..................... | 290/44 |
| 8,084,874 B2 * | 12/2011 | Llorente Gonzalez ........ | 290/44 |
| 2006/0273595 A1 * | 12/2006 | Avagliano et al. ............ | 290/44 |

FOREIGN PATENT DOCUMENTS

| | | |
|---|---|---|
| EP | 1988284 | 11/2008 |
| GB | 2428748 | 2/2007 |
| WO | WO 2008/131776 | 11/2008 |

* cited by examiner

*Primary Examiner* — Ryan Jarrett
(74) *Attorney, Agent, or Firm* — Merchant & Gould (57) ABSTRACT

Wind turbine control may be provided. First, a control parameter indicative of foreseeable fluctuations in a rotational speed of a rotor due to wind turbulence may be obtained. The first control parameter may be calculated based on a first signal indicative of a wind power and a second signal indicative of wind turbulence intensity. Then, the control parameter may be compared with a threshold value. Next, a maximum power to be generated by the wind turbine may be reduced if the control parameter exceeds said threshold.

24 Claims, 4 Drawing Sheets

WIND TURBINE CONTROL

RELATED APPLICATION

This application claims priority benefits based on Spanish Patent Application No. 200900783, filed Mar. 23, 2009, the disclosure of which is hereby incorporated herein by reference.

BACKGROUND

Due to the increasing average size of rotors installed in wind turbines, and the need to limit the loads produced by the wind while guaranteeing the maximum possible power performance, variable speed and blade pitch control technologies have expanded. The wind turbines function by maximising their aerodynamic performance in a low winds regime. A variable rotational speed of the rotor may limit a wind turbine's rotational speed by modulating the torque in a power generator in a determined medium winds regime and, at high winds, restrict the rotor's rotational speed against gusts.

In the high winds regime, when the wind turbine produces the nominal power and the blade pitch angle limits the speed, a set of protective actions are established. The actions usually comprise shutting down operation. This may comprise a disconnection of the wind turbine and taking the blades to the feathered position when a certain rotational speed of the rotor is exceeded or when certain wind values above certain thresholds are detected, among other circumstances. Nonetheless, although these manoeuvres may protect the wind turbine in severe weather conditions, they may also subject it to fatigue.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Wind turbine control may be provided. First a control parameter indicative of foreseeable fluctuations in a rotational speed of a rotor due to wind turbulence may be obtained. The first control parameter may be calculated based on a first signal indicative of a wind power and a second signal indicative of wind turbulence intensity. Then, the control parameter may be compared to a threshold value. Next, a maximum power to be generated by the wind turbine may be reduced if the control parameter exceeds said threshold.

Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Figure 1:
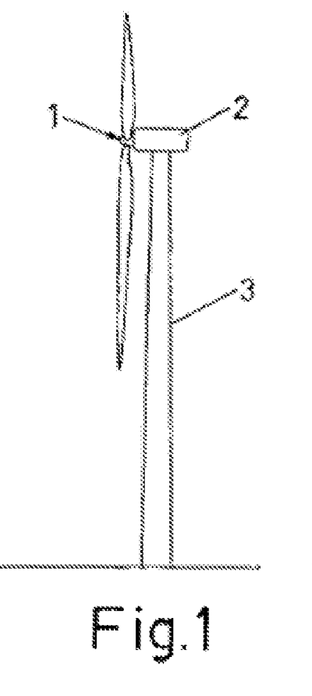
FIG. 1 shows a typical layout of an aerogenerator.
Figure 2:
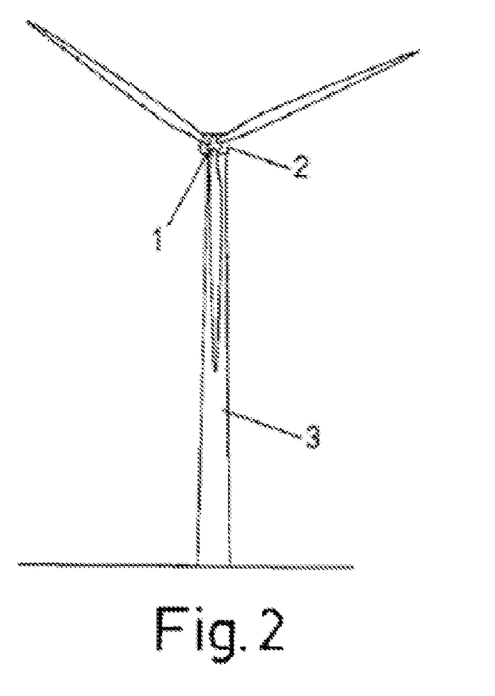
FIG. 2 shows a typical layout of an aerogenerator.

FIGS. 1 and 2 show an aerogenerator comprising a tower 3, a nacelle 2 and a rotor 1 made up of several blades with said rotor rotating in respect of an axis.

Figure 3:
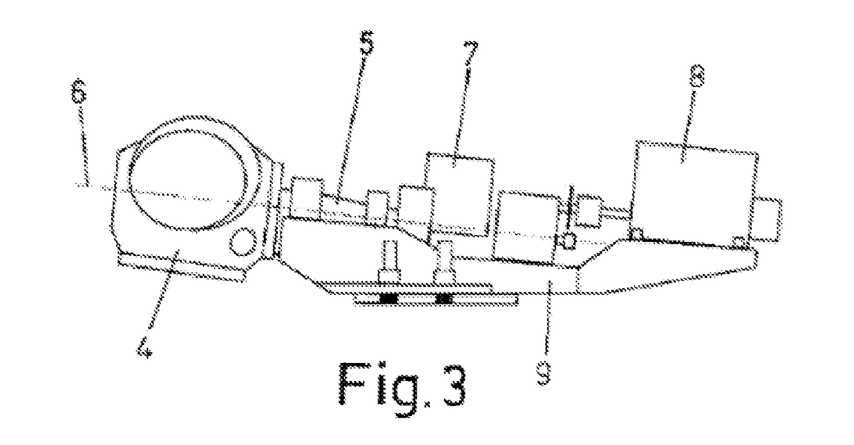
FIG. 3 shows the main components of the nacelle, according to lateral view.

FIG. 3 illustrates the main components of the nacelle from a lateral view, in such a way that said rotor of the aerogenerator rotates around a substantially horizontal axis 6 comprising mainly a hub 4, a low speed shaft 5, a multiplier 7 and a power generator 8 that may convert the mechanical energy into electrical energy. The assembly may be supported by a frame 9.

Figure 4:
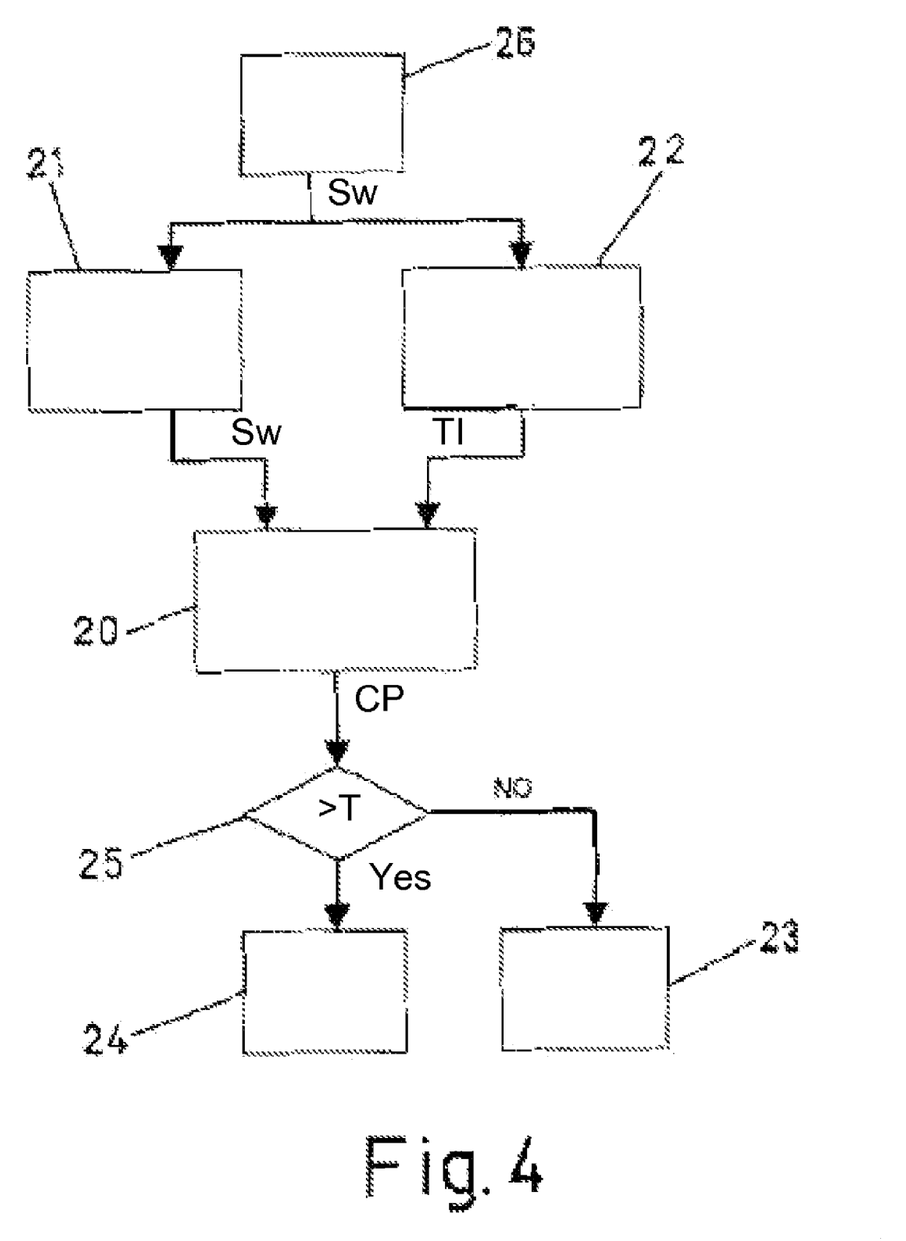
FIG. 4 is a flow chart for providing a method and system for wind turbine control.

FIG. 4 shows the modules or stages of an embodiment of the control method and system of the invention. Consistent with embodiments of the invention, in stage 20, a control parameter (CP), indicative of the fluctuations of the rotor's rotational speed foreseeable as a result of the wind turbulence, may be calculated on the basis of a signal (Pw) indicative of the wind power, which may be calculated in stage 21, and a signal (TI) indicative of the turbulence intensity of the wind, which may be calculated in stage 22.

The control parameter (CP) may be compared to a threshold value (T) in such a way that if the control parameter surpasses said threshold a safe mode may be entered into stage 24, which may reduce the maximum power to be generated by the wind turbine. If the control parameter (CP) does not surpass the threshold (T), the wind turbine may remain in normal functioning mode 23.

The reduction in the maximum power to be generated may only affect high winds when the rotor's rotational speed may be regulated through adjustment of the blade pitch angle. In order to establish the value of said threshold (T), embodiments of the invention may gather historical data of a wind turbine functioning with a control system and a given set of control parameters.

From this historical data the occurrence of overspeeds may be analysed according to the proposed control parameter, and a threshold value may be deduced. In various embodiments, said threshold value may be selected to maximise the energy produced considering the trade-off made for loss of availability due to wind turbine shutdowns for overspeeds and the reduction in power caused by said strategy, without prejudice to the turbine's useful life due to the fatigue caused in either case.

In various other embodiments, other criteria may be considered for selecting the threshold value, such as increasing the energy produced. Consistent with embodiments of the invention, a set of threshold power values are selected (ordered from lowest to highest) in such a way that according to the number of threshold values exceeded by the control parameter, a rising level of power reduction is activated.

To this effect, a set of threshold values (T) may be selected (ordered from lowest to highest) if in module 25 the control parameter (CP) surpasses in various comparisons the same number of threshold values. State 23 may be equivalent to maintaining constant the level of reduction of maximum power to be generated. On the contrary, if in the comparison 25 the number of threshold values exceeded by the control parameter (CP) was to increase or decrease, state 24 may be equivalent to increasing or decreasing the level of reduction of maximum power to be generated by the turbine.

In various embodiments, the signal indicative of the wind power (Pw) may be obtained in stage 21 based on the value resulting from cubing a signal indicative of the wind (Sw). Additionally, previous calculation may be made of the average ($\overline{Sw}$) of the signal indicative of the wind over a period of time:

$$Pw=(\overline{Sw})^3$$

In various embodiments of the invention, the signal indicative of the wind's turbulence (TI) may be obtained in stage 22 based on the deviation between the signal indicative of the wind (Sw) and the average of the signal indicative of the wind over a period of time.

Consistent with embodiments of the invention, the signal indicative of the wind's turbulence may be the turbulence intensity defined as the quotient of the standard deviation of a signal indicative of wind divided by the mean of said signal indicative of the wind ($\overline{Sw}$):

$$TI = \frac{\sigma(Sw)}{\overline{Sw}}$$

Consistent with embodiments of the invention, the control parameter (CP) may be obtained as the product of the signal indicative of wind power multiplied by the signal indicative of turbulence:

$$CP=Pw \cdot TI=(\overline{Sw})^2 \cdot \sigma(Sw)$$

Aerogenerators may incorporate an anemometer on the nacelle in order to measure the wind velocity. This measurement from the anemometer may be used as the signal indicative of the wind (Sw). However, in a generator with a rotor oriented upwind, the measurements obtained may have the inconvenience of gathering the effect of turbulence caused by the pitch of the blades.

Additionally said measurements may be a single point measurement, not fully representative of the wind impacting on the area swept by the rotor. There are other operative parameters of the turbine that may indicate the velocity of the wind impacting on the turbine. In embodiments of the invention, the signal indicative of the wind (Sw) may be obtained in a stage 26 based on the blade pitch angle ($\beta$) as a signal indicative of the wind (Sw).

Figure 7:
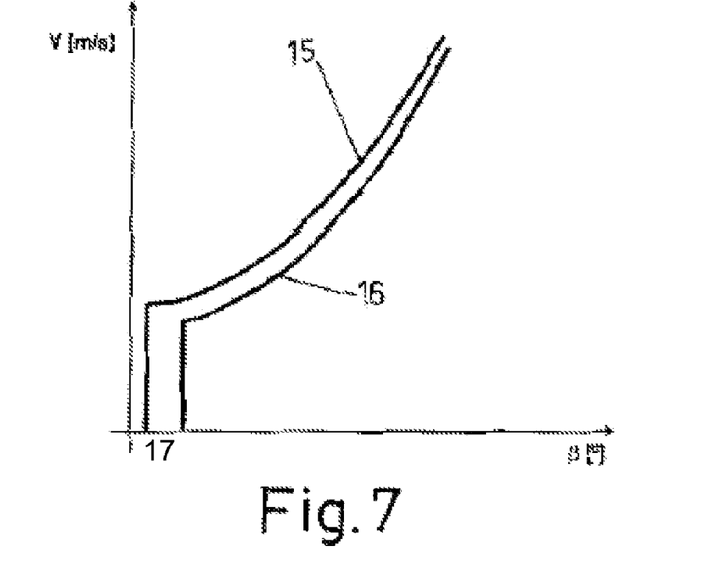
FIG. 7 shows the relationship existing between the blade pitch angle of a wind turbine of variable speed and blade pitch angle control towards feathered.

The blade pitch angle may be used to adjust the power captured from the wind. FIG. 7 presents the relationship existing between the average wind impacting on the wind turbine (W) and the blade pitch angle ($\beta$) of a wind turbine of variable speed and control by adjustment of the blade pitch angle towards feathering. In general, said type of wind turbine may follow a curve 15 upon producing a maximum power to be generated equal to its nominal power. At low and average winds, producing a lower power than the nominal one, the blade pitch angle may be substantially maintained over a minimum blade pitch angle 17. At high winds an average power may be produced equal to the nominal power for which the blade pitch angle maybe moved towards feathered, reducing the angle of attack. If the wind turbine were to function with a certain level of power reduction, the relationship between the blade pitch angle and the wind impacting on the turbine may follow a different path 16.

Similarly, wind turbines of variable speed and control, by adjustment of the blade pitch angle towards stall, may also maintain the blade pitch angle ($\beta$) substantially constant in the zone of production of nominal power over an angle 17. At the same time, at high winds, the power may be maintained constant by increasing the angle of attack by decreasing the pitch angle. The blade pitch angle 17, in the case of wind turbines of variable speed and control by adjustment of blade pitch angle towards stall, may correspond to a maximum blade pitch angle.

The signal indicative of the wind (Sw) may be calculated on the basis of the blade pitch angle and the relationship 15 between the blade pitch angle and the wind:

$$Sw=g(\beta)$$

Consistent with embodiments of the invention, this last expression can be used to deduce the control parameter (CP) according to the following expression:

$$CP = (\overline{Sw})^2 \cdot \sigma(Sw) \approx g^2(\overline{\beta}) \cdot \sigma(g(\beta)) \approx g^2(\overline{\beta}) \cdot \left.\frac{\partial g}{\partial \beta}\right|_{\overline{\beta}} \cdot \sigma(\beta),$$

with ($\overline{\beta}$) being the mean pitch angle.

Figure 8:
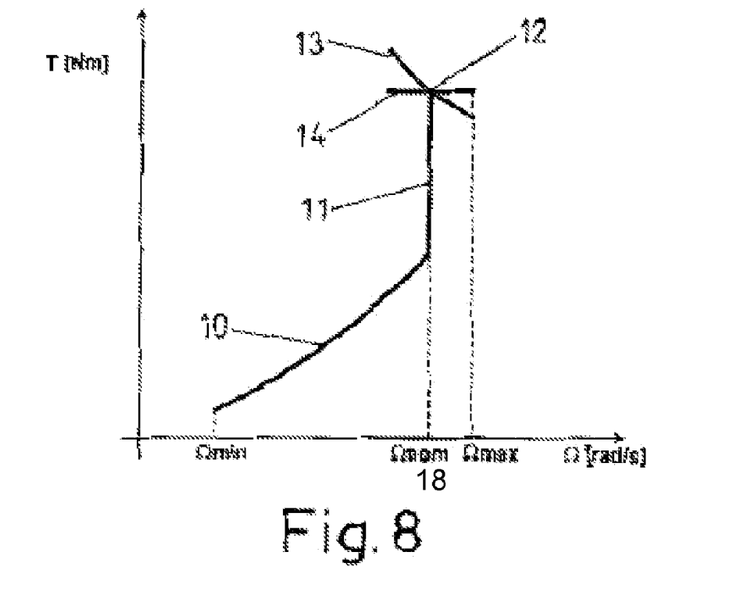
FIG. 8 shows a graph of a stationary curve of electrical torque according to the rotor's rotational speed.

FIG. 8 illustrates a stationary curve of electrical torque required from the power generator according to the rotor's rotational speed, commanded by the control system for the case of a variable speed aerogenerator. In said curve, there: i) is a zone 10 of energy generation for low winds wherein the aerodynamic performance may be maximised thanks to the turbine's capacity of functioning at variable speed, ii) a zone 11 of generation at medium winds wherein the rotational speed may be limited to the nominal speed 18, modulating the torque in the power generator, and iii) a point 12 of nominal power generation at high winds whose rotational speed is regulated by means of the blade pitch angle control.

Said adjustment may be carried out by means of a reference of rotational speed, which adjusts to the nominal speed 18. At said stationary point of nominal power generation, variations in the rotational speed of the rotor may be allowed in a transient manner, which can either be according to a certain curve 13 of constant power, or according to a certain curve 14 of constant torque, or even through a strategy that combines the two.

The wind speed of an anemometer situated on the turbine's nacelle may provide a redundant estimation indicative of the wind. Consistent with embodiments of the invention, measurements of the anemometer may be used for the calculation of the control parameter in those functioning regimes of the machine where there is not an active control of the blade pitch angle in order to regulate the rotor's rotational speed. In this way, it may be possible to contemplate reductions of maximum power to be generated in the start-ups of the wind turbine, or in transients of medium winds to high winds.

Consistent with embodiments of the invention, the period of time for which measurements of signals indicative of the wind and of the wind's turbulence intensity are taken for the estimation of the proposed control parameter may be 10 minutes.

Figure 5:
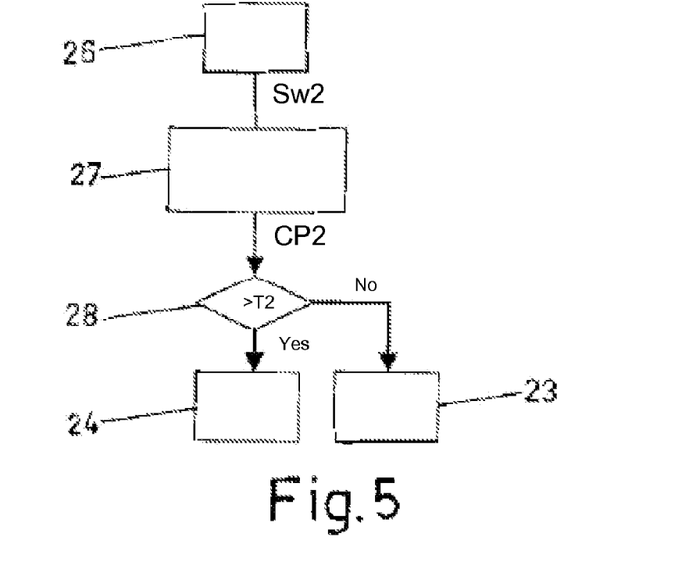
FIG. 5 is another flow chart for providing a method and system for wind turbine control.

FIG. 5 shows the modules or stages of a preferred embodiment, wherein a second control parameter may be obtained (CP2) in stage 27 indicative of the severity of a change in the wind velocity calculated on the basis of the integral of the absolute value of a derivative of a second signal indicative of the wind (Sw2), obtained from a module 26.

$$CP2 = \int_{t_0}^{t_0+\Delta t} \left| \frac{dSw2}{dt} \right| \cdot dt$$

Consistent with embodiments of the invention, the second signal indicative of the wind (Sw2) may be obtained from the blade pitch angle. The second control parameter (CP2) may be compared 28 with a second threshold value (T2) in such a way that the maximum power to be generated by the wind turbine is reduced moving into safe mode 24 defined by a certain reduction in the maximum power to be generated if the control parameter exceeds said threshold. In the opposite case, normal mode 23 may be maintained. The safe mode 24 activated by the second control parameter (CP2) surpassing the threshold (T2) may last a certain period of time, thereafter returning to normal mode 23. Normal mode 23 thus defined may include any level of power reduction activated by the control parameter (CP). The threshold (T2) may be calculated on the basis of historical data with a similar procedure to the one already described herein for adjusting the threshold (U).

Consistent with embodiments of the invention, this second control parameter may be evaluated in time intervals of between 20 and 30 seconds. When either control parameter (CP) or (CP2) exceeds its respective limits, the wind turbine may enter a safe mode 24. Said safe mode may comprise reducing the power generated in order to reduce the probabilities of the turbine shutting down due to overspeed. In various embodiments, the reduction in the maximum power to be generated is carried out, reducing the reference of the rotor's rotational speed, or in other words, the nominal speed 18.

Consistent with embodiments of the invention, the reduction of the nominal speed 18 may affect the high winds zone, or, for example, the zone of nominal power production 12, and likewise may affect the zone of limiting the rotational speed by modulating torque, or, for example, the zone of medium winds 11.

Consistent with embodiments of the invention, the reduction in nominal speed 18 affects the high winds zone exclusively, or, for example, the zone of nominal power production 12, at the same time as the speed in the medium winds zone 11, may be maintained fixed. In various embodiments, a low-pass filter may be applied in order to soften the change in the rotational speed of the rotor. The reduction in the maximum power to be generated by the wind turbine may comprise additionally the stage of increasing the minimum blade pitch angle 17.

In FIG. 7, one can see the curve 15 of the blade pitch angle in normal mode 23 and a curve 16 corresponding to safe mode 24. Consistent with embodiments of the invention, the reduction in the maximum power to be generated by the wind turbine may further comprise the stage of maintaining the required torque constant. In FIG. 8, one can see a constant torque control 13, corresponding to normal mode 23 and a constant torque control 14, corresponding to safe mode 24.

Figure 6:
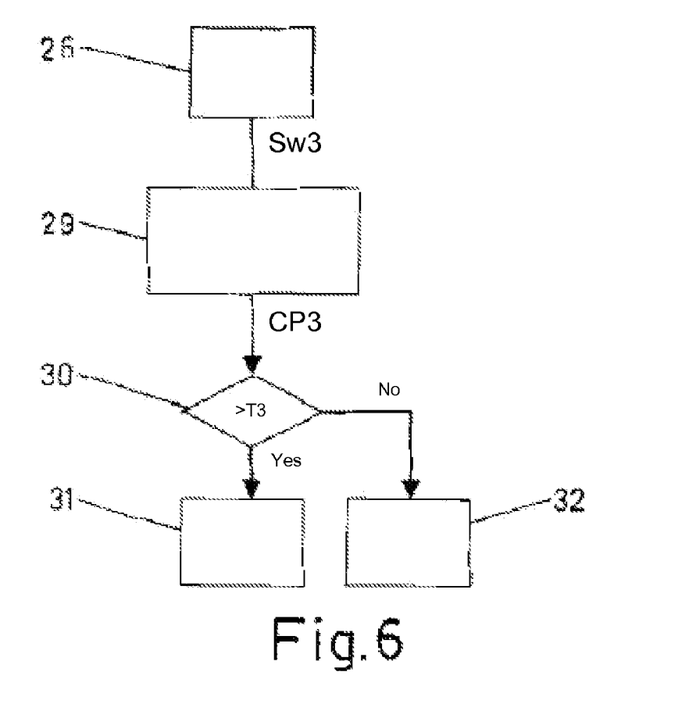
FIG. 6 is yet another flow chart for providing a method and system for wind turbine control.

FIG. 6 shows the modules or stages of a preferred embodiment of the control method and system of another aspect of the invention wherein in 29 a third control parameter (CP3) may be obtained from a third value indicative of the wind (Sw3) obtained in 26 based on the blade pitch angle. Said third control parameter (CP3) indicative of the wind may be compared with a third threshold parameter (T3) in such a way that, if it is exceeded, the shutdown maneuver 31 is activated. In the opposite case, the wind turbine may continue to function 32.

Consistent with embodiments of the invention, the third threshold value may not be unique. Rather, a set of threshold power values may be selected depending on the previously applied reduction in maximum power to be generated. In various embodiments, said set of threshold values may be obtained by means of computer simulations. The correlation may be verified between the blade pitch angle and the wind impacting on the wind turbine measured with at least one anemometer for a maximum power reduction carried out, and if said verification is negative, a shutdown manoeuvre 31 may be executed.

Consistent with embodiments of the invention, various curves may be obtained 15 which relate the blade pitch angle ($\beta$) and the wind impacting on the rotor (V) for each reduction in maximum power, and a tolerance margin of adjustment to said curves may be obtained for each estimated condition of functioning. Said correlation may be carried out from averages or filtered signals of the blade pitch angle ($\beta$) and the wind measured with an anemometer, which may include samples taken in a total period of 10 minutes.

Consistent with embodiments of the invention, the signal indicative of the wind affecting the wind turbine may come from at least one anemometer situated on the nacelle of the wind turbine itself. Consistent with other embodiments of the invention, if there is no wind signal available from an anemometer installed on the nacelle of the turbine itself, the correlation between the wind affecting the rotor and the blade pitch angle may be carried out through an estimation of the wind impacting on the turbine, calculated on the basis of the signal coming from at least one adjacent turbine or from a nearby meteorological tower.

For this purpose, wind turbines may send to a unit that controls a corresponding wind farm the estimation of the speed and direction of the impacting wind from their own anemometers and wind vanes situated on the nacelle and an indicator regarding the reliability of said signal. Said reliability indicator may be estimated, for example, from the correlation between the wind velocity provided by the anemometer and the blade pitch angle.

Stages 20, 21, 22, 23, 24, 25, 26, 27, 28, 29, 30, 31 and 32 may be independent modules or alternatively a calculating unit may be adjusted in order to carry out the calculations described above.

Consistent with embodiments of the invention, when one of the control parameters described above exceeds its corresponding threshold value, the speed and/or power control loop may be modified, in order to modify its dynamic. Usually, the speed control loop may act on the blade pitch angle adjustment system, whereas the power control loop may act on the torque required from the generator. By allowing faster dynamics in the blade pitch angle and/or the torque in the generator, one may achieve the control having a greater capacity to respond to potential overspeeds caused by gusts of wind.

Consistent with embodiments of the invention, said modification of the dynamic may be carried out either through a change in the parameters of the controller, for example, by modifying the gains of a proportional-integral type controller (PI), through a modification of the filtering of the signal that feeds the controller itself, through an increase in the saturation limits of the angular speed of the blade pitch adjustment system, or through a combination of several such modifications. This may be, therefore, an alternative way of preventing overspeeds that can replace the reduction in power and/or speed. Alternatively, in a simultaneous manner control loops can be modified and the power and/or speed of the machine can be reduced.

In the functioning mode whereby the aerogenerator limits its power through a variation in the blade pitch angle, the rotational speed of the rotor may not be a signal indicative of the wind velocity. Nonetheless, the dynamic of the transients in the wind velocity may produce transients in the speed of the rotor which cause the control system to activate, adjusting the blade pitch angle. In this way, the control system may maintain the rotational speed of the rotor under control around a reference value.

Consistent with embodiments of the invention, the calculation of the second control parameter described above may be used as a signal indicative of a derivative of the wind the acceleration of the rotor's rotation. Said acceleration may be measured or estimated. In an equivalent fashion, the acceleration in the rotation of the power generator may be used.

Consistent with embodiments of the invention, control parameters may reflect the effect of turbulence on the foreseeable variability in a rotor's rotational speed. Therefore, unlike turbulence intensity, a sign that characterises the properties of the wind, the control parameters may describe the effect of the wind on the rotational speed of the wind turbine rotor.

It may be possible to gather historical data of the wind turbine in operation using a control system. From said historical data it may be possible to analyze which threshold values of the control parameter are associated with situations of overspeeds in the rotor's rotation. Said historical records may be replaced by computer simulations of the wind turbine evaluated with said control system, for the purpose of deducing said threshold.

In this way, either through experiment or simulation, it is possible to define the threshold value of the control parameter. By comparing the control parameter to the threshold value, it may be deduced whether the risk of an emergency shutdown occurring is too high to allow certain operating conditions. To this effect, the corresponding reduction in the maximum power to be generated by the wind turbine may prevent turbine operation in adverse working conditions to the point that in the turbine overspeeds, and therefore, shuts down.

Said process of defining the control parameter threshold value which requires the appropriate functioning conditions for a wind turbine with a control system may be repeated for different potential power reduction conditions and for different control algorithms. Consistent with embodiments of the invention, the signal indicative of the wind power may be obtained from the value resulting from cubing a signal indicative of the wind. In a preferred embodiment of the invention, the signal indicative of the wind turbulence is obtained on the basis of the deviation between the signal indicative of the wind and the mean of the signal indicative of the wind over a period of time. In various embodiments, the blade pitch angle may be used as the signal indicative of the wind.

In this way, the wind measurement used to evaluate the control parameter comprises that resulting from the wind over the entire area swept by the rotor, and also avoids the effect induced by the blades passing over the meteorological equipment usually situated on the nacelle, downwind in relation to the rotor. In another aspect of the invention when the wind turbine is stopped, a measurement from an anemometer situated on the turbine's nacelle may be used as the signal indicative of the wind, using the control parameter in order to calculate the maximum power to be generated by the turbine following a start-up. This measurement of the control parameter may be redundant based on the blade pitch angle, and may be useful in various situations.

For example, in a start-up of the machine it may be possible to calculate the maximum power to be generated by the turbine if the measurement of the control parameter based on the anemometer on the nacelle is available. In addition, in the low and medium winds zone when there is no activity in the blade pitch control system in order to regulate the rotor's rotational speed, this measurement may be used to guarantee the safe functioning of the turbine upon an increase in the average wind velocity that forces the blade pitch angle to be controlled in order to regulate the speed.

The control parameter may be calculated even when the wind turbine is stopped, a situation when at the same time, there is no disturbance caused by the blade's pitch on the wind velocity measurement. The control parameter calculated in this way may be used to distinguish whether the weather conditions require a reduction in power to prevent potential situations of overspeed in the rotor's rotation.

Embodiments of the invention may obtain a control parameter indicative of the severity of a change in the wind velocity. This control parameter may be calculated as the integral of the absolute value of the derivative of a second signal indicative of the wind. This control parameter may be compared to a threshold value. When the control parameter exceeds the threshold, the maximum power to be generated by the wind turbine may be reduced.

This control parameter may be calculated in a different time interval to the one above, which may be lower than that used for the calculation of the above control parameter. In this way the wind turbine is protected against extreme transient weather situations. This control parameter may constitute an accessory to the above control parameter, since it detects wind dynamics in a different frequency range which are likely to provoke overspeeds in the wind turbine rotor. Consistent with embodiments of the invention, a blade pitch angle may be used as the second signal indicative of the wind.

A reduction in the maximum power to be generated by the wind turbine may be carried out by reducing the nominal rotational speed of the rotor, or the rotational speed of the wind turbine, when the maximum permissible power is produced. In various embodiments, the reduction in the maximum power to be generated by the wind turbine may comprise increasing the minimum blade pitch angle. In yet more embodiments, the reduction in the maximum power to be generated by the wind turbine may comprise, in the high winds regime wherein the rotational speed of the rotor is limited by means of the blade pitch angle control, maintaining the torque required of the generator substantially constant. By imposing a constant torque approach in the strategy of reducing the maximum power to be generated by the turbine, the potential dynamic instability resulting from potential constant power control strategies may be avoided.

Consistent with embodiments of the invention, an additional control parameter indicative of the wind velocity based on the blade pitch angle may be obtained. This additional control parameter may be compared to an additional threshold value. A shutdown manoeuvre may be activated if the additional control parameter exceeds the additional threshold value. This control method based on the additional control parameter may guarantee that the wind turbine only functions in design operating conditions, avoiding overloads caused by excessive wind.

In this way, the wind measurement used for the evaluation of the control parameter may comprise that resulting from the wind over the entire area swept by the rotor, and may also avoid the effect induced by the blade pitch over the meteorological equipment usually situated on the nacelle, downwind. There may also be a check of the correlation between the blade pitch angle and a signal indicative of the wind impacting on the wind turbine measured with at least one anemometer, in such a way that if not verified, the shutdown manoeuvre is activated.

Among other causes, ice or dirt that sticks to the blades may alter their aerodynamics. Among other causes, these circumstances may provoke variations in the relationship between the blade pitch angle and the average wind impacting on the wind turbine for a reduction of the maximum power to be generated.

By verifying a good correlation between these measurements one can guarantee the reliability of the estimate of average wind impacting on the turbine based on the blade pitch angle.

Consistent with embodiments of the invention, said correlation may be carried out in such a way that the signal indicative of the wind impacting on the wind turbine comes from at least one anemometer situated on a wind turbine or nearby meteorological tower. In this way, advantage may be taken of the existence of nearby anemometers in order to increase the system's reliability.

If the anemometer of the wind turbine's nacelle should not function correctly, the wind impacting on the turbine may be estimated either from the signals coming from nearby wind turbines or from a measurement coming from a nearby meteorological tower. Consistent with embodiments of the invention, a wind turbine may be presented which comprises a rotor, a blade pitch angle adjustment system, and a calculating unit to carry out the control methods described above.

What is claimed is:

1. A method for controlling a wind turbine with variable speed and blade pitch angle control, the method comprising:
   receiving a first signal indicative of a wind power;
   receiving a second signal indicative of wind turbulence intensity;
   obtaining a first control parameter indicative of foreseeable fluctuations in a rotational speed of a rotor based on the first signal indicative of the wind power and the second signal indicative of the wind turbulence intensity;
   comparing the first control parameter with a first threshold value;
   foreseeing fluctuations in a rotational speed of a rotor based on the comparison of the first control parameter with the first threshold value; and
   reducing a maximum power to be generated by the wind turbine if the first control parameter exceeds said first threshold value.

2. The method of claim 1, wherein the first signal indicative of the wind power is obtained from a value resulting from cubing of a third signal indicative of the wind.

3. The method of claim 2, wherein the second signal indicative of wind turbulence intensity is obtained from a deviation between the third signal indicative of the wind and an average of the third signal indicative of the wind over a period of time.

4. The method of claim 3, wherein the third signal indicative of the wind comprises a blade pitch angle.

5. The method of claim 3, wherein the third signal indicative of the wind comprises a measurement of an anemometer situated on the turbine's nacelle when the wind turbine is stopped.

6. The method of claim 5, further comprising using the first control parameter in order to calculate the maximum power to be generated by the turbine following a start-up.

7. The method of claim 1, further comprising:
   obtaining a second control parameter indicative of a severity of a change in wind speed, the second control parameter being calculated as an integral of an absolute value of a derivative of a third signal indicative of the wind;
   comparing the second control parameter with a second threshold value; and
   reducing the maximum power to be generated by the wind turbine if the second control parameter exceeds the second threshold value.

8. The method of claim 7, wherein the third signal indicative of the wind power comprises the blade pitch angle.

9. The method of claim 1, wherein reducing the maximum power to be generated by the wind turbine comprises reducing a nominal speed of rotation of a rotor.

10. The method of claim 9, wherein reducing the maximum power to be generated by the wind turbine comprises increasing the minimum blade pitch angle.

11. The method of claim 10, wherein reducing the maximum power to be generated by the wind turbine comprises, in a high winds regime when a rotor's rotational speed is limited by controlling the blade pitch angle, maintaining the torque required of a generator substantially constant.

12. The method of claim 1, further comprising:
   obtaining a third control parameter indicative of the wind speed based on the blade pitch angle;
   comparing the third control parameter with a third threshold value; and
   activating a shutdown manoeuvre if the third control parameter exceeds the third threshold value.

13. The method of claim 12, further comprising verifying a correlation between the blade pitch angle and a third signal indicative of the wind impacting on the wind turbine obtained from at least one anemometer.

14. The method of claim 13, wherein activating the shutdown manoeuvre comprises activating the shutdown manoeuvre if the correlation is not verified.

15. The method of claim 13, wherein the third signal indicative of the wind is provided by a central control which calculates the third signal based on at least one anemometer situated on a wind turbine or nearby meteorological tower.

16. The method of claim 1, further comprising:
   obtaining a second control parameter indicative of a severity of a change in wind speed, the second control parameter being calculated as an integral of an absolute value of a derivative of a third signal indicative of the wind,
   comparing the second control parameter with a second threshold value, and
   if the second control parameter exceeds the second threshold value, performing at least one of the following: reducing the maximum power to be generated by the wind turbine, reducing the rotational speed of a rotor, and modifying a dynamic of a speed and power of control loops.

17. The method of claim 1, wherein the control parameter is calculated as a product of the first signal indicative of wind power multiplied by the second signal indicative of wind turbulence intensity.

18. A method for controlling a wind turbine with variable speed and blade pitch angle control, the method comprising:

obtaining a control parameter indicative of foreseeable fluctuations in a rotational speed of a rotor based on a first signal indicative of wind power and a second signal indicative of wind turbulence;

comparing the control parameter with a threshold value;

foreseeing fluctuations in the rotational speed of the rotor based on the comparison of the first control parameter with the threshold value; and if the control parameter exceeds the threshold value, performing at least one of the following:

reducing a maximum power to be generated by the wind turbine, reducing the rotational speed of the rotor, and modifying a dynamic of a speed and power of control loops.

19. The method of claim 18, wherein the first signal indicative of the wind power is obtained from a value resulting from cubing of a third signal indicative of the wind.

20. The method of claim 19, wherein the second signal indicative of wind turbulence intensity is obtained from a deviation between the third signal indicative of the wind and an average of the third signal indicative of the wind over a period of time.

21. The method of claim 18, wherein the control parameter is calculated as a product of the first signal indicative of wind power multiplied by the second signal indicative of wind turbulence.

22. A wind turbine comprising:
a rotor;
a blade pitch adjustment system; and
a calculating unit, wherein the calculating unit is operative to:
calculate a control parameter as a product of a first signal indicative of wind power multiplied by a second signal indicative of wind turbulence, the control parameter indicative of foreseeable fluctuations in a rotational speed of the rotor,
compare the control parameter with a threshold value, and
reduce a maximum power to be generated by the wind turbine if the control parameter exceeds the threshold value.

23. The wind turbine of claim 22, wherein the calculating unit is further operative to reduce the rotational speed of the rotor if the control parameter exceeds the threshold value.

24. A wind turbine comprising:
a rotor,
a blade pitch adjustment system, and
a calculating unit,
wherein the calculating unit is operative to:
obtain a control parameter indicative of foreseeable fluctuations in a rotational speed of the rotor, the control parameter being calculated as a product of a first signal indicative of wind power multiplied by a second signal indicative of wind turbulence;
compare the control parameter with a threshold value; and
if the control parameter exceeds the threshold value, the calculating unit being further operative to perform at least one of the following:
reduce a maximum power to be generated by the wind turbine,
reduce the rotational speed of the rotor, and
modify a dynamic of a speed and power of control loops.

* * * * *